Figure 1A:
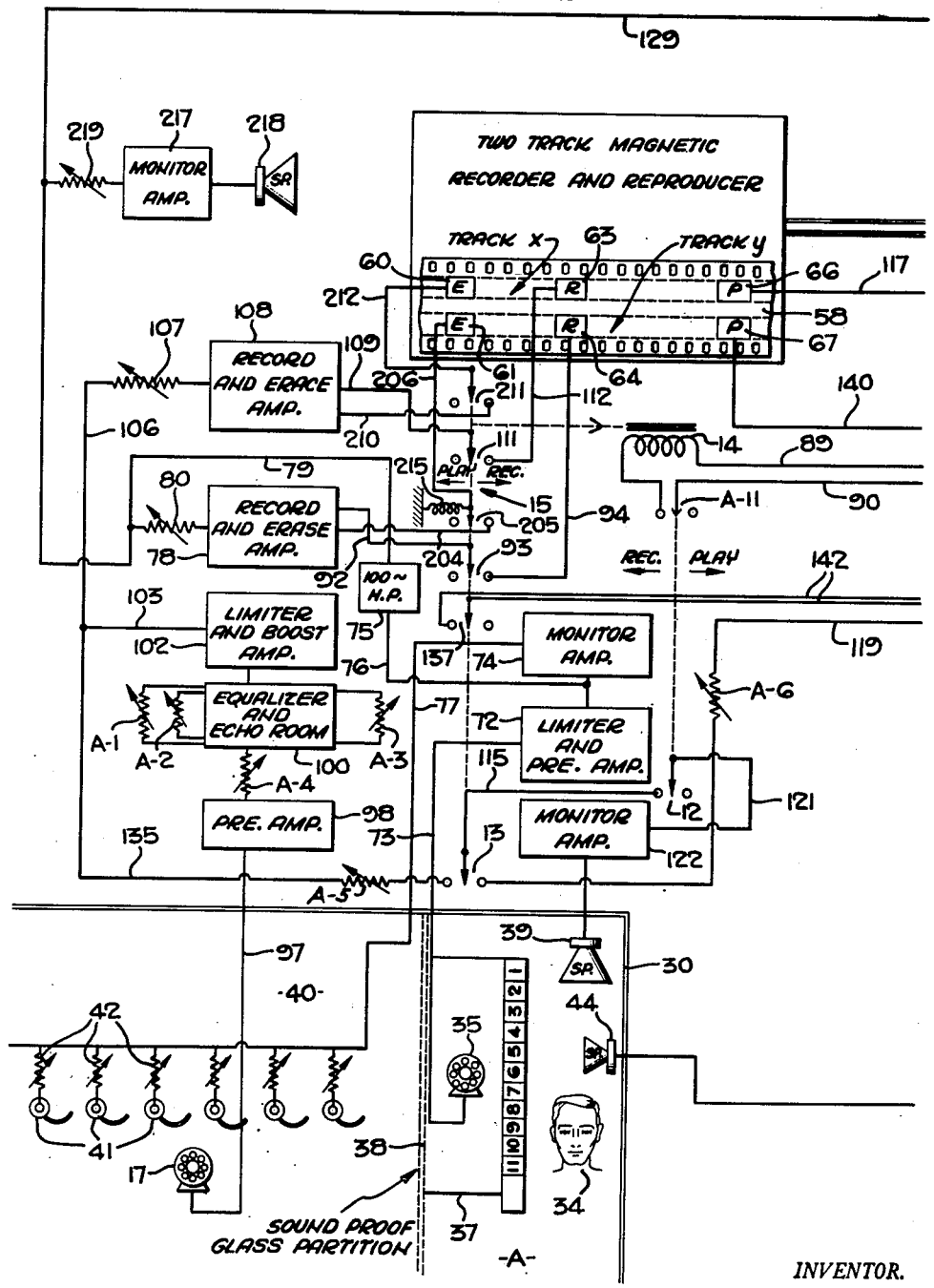

March 31, 1953

A. BADMAIEFF 2,633,055

AUTOMATICALLY CONTROLLED MULTITRACK RERECORDING AND REPRODUCING SOUND SYSTEM

Filed Oct. 3, 1949

2 SHEETS—SHEET 2

INVENTOR.
Alexis Badmaieff

Patented Mar. 31, 1953

2,633,055

UNITED STATES PATENT OFFICE 2,633,055

AUTOMATICALLY CONTROLLED MULTI-TRACK RERECORDING AND REPRODUCING SOUND SYSTEM

Alexis Badmaieff, Los Angeles, Calif.

Application October 3, 1949, Serial No. 119,385

17 Claims. (Cl. 88—16.2)

This invention relates to the production of motion pictures, and particularly to the automatic recording and reproduction of concomitant sound for motion picture action sequences.

In the production of motion pictures, it is well-known that the various sequences making up the complete picture are photographed separately at different times, and that many "takes" are made, both with the photographing camera and with the sound recorder, before proceeding to the next sequence. What is known as "pre" and "post-scoring" have been practiced in motion picture production, especially where it is desired to obtain the best quality rendition of a song. By this method, a sound track of the song is made under optimum acoustical conditions, and the singer is able to concentrate solely on the recording of the song. Then, during the photographing of the scene in which the song occurs, the recording is reproduced and the singer sings the song in synchronism with the reproduction, while concentrating on the action of the scene.

The present invention, however, is directed to a system for pre-recording the dialogue required in a complete picture, in pre-arranged sequences, to conform with the sequences as they are to be subsequently photographed. This dialogue track may be made under a director's instructions and corrections may be made until the final take is considered satisfactory. The director may communicate with the actors who are arranged around a microphone and who may read their lines from scripts, as is done in the broadcasting of radio programs. Simultaneously with the recording of the dialogue, the director may give instructions which are recorded on a second track and which may or may not be on the same record medium. This dialogue track will then serve two purposes; first, it will serve as a prompter for the actors during the action of the scene, and second, it will provide the final sound track to be synchronized with the picture sequences photographed later. Simultaneously with the reproduction of the dialogue, the director's instructions may be reproduced so that the necessary prompting may be provided. The instructions may be given by the reproduction from a loudspeaker on the set or by magnetic wave transmission to concealed earphones worn by the actors.

If, during the photographing of the scene to accompany the pre-scored dialogue, the actor forgets his lines, he may slightly turn his head and "mouth" the dialogue and concentrate on the action in the scene. In this manner, not only is it not necessary that the actors completely memorize their lines, but a better rendition of the dialogue will result. This will permit the actors to act in more scenes in a given length of time than heretofore possible, and with fewer errors. If, however, an error is made in the acting, the director may reverse the sound recorder, which will automatically stop at the beginning of a sequence, and another "shot" may be made of the scene. The system also provides for the automatic placing of snychronizing marks between sound sequences on the sound film, and also, automatic synchronizing marks between picture sequences on the picture film, and the marking of the unsatisfactory "takes," which will eventually be eliminated and not printed.

The principal object of the invention, therefore, is to facilitate the production of motion pictures.

Another object of the invention is to provide a pre-scored dialogue sound recording and reproducing system.

A further object of the invention is to provide an automatic control of a sound recorder for stopping and recording synchronization marks on the sound track, and subsequently, a corresponding synchronization mark on the film.

A still further object of the invention is to provide an improved sound recording system for recording dialogue and director's instructions which may simultaneously be reproduced during the photographing of a scene.

Figure 1B:
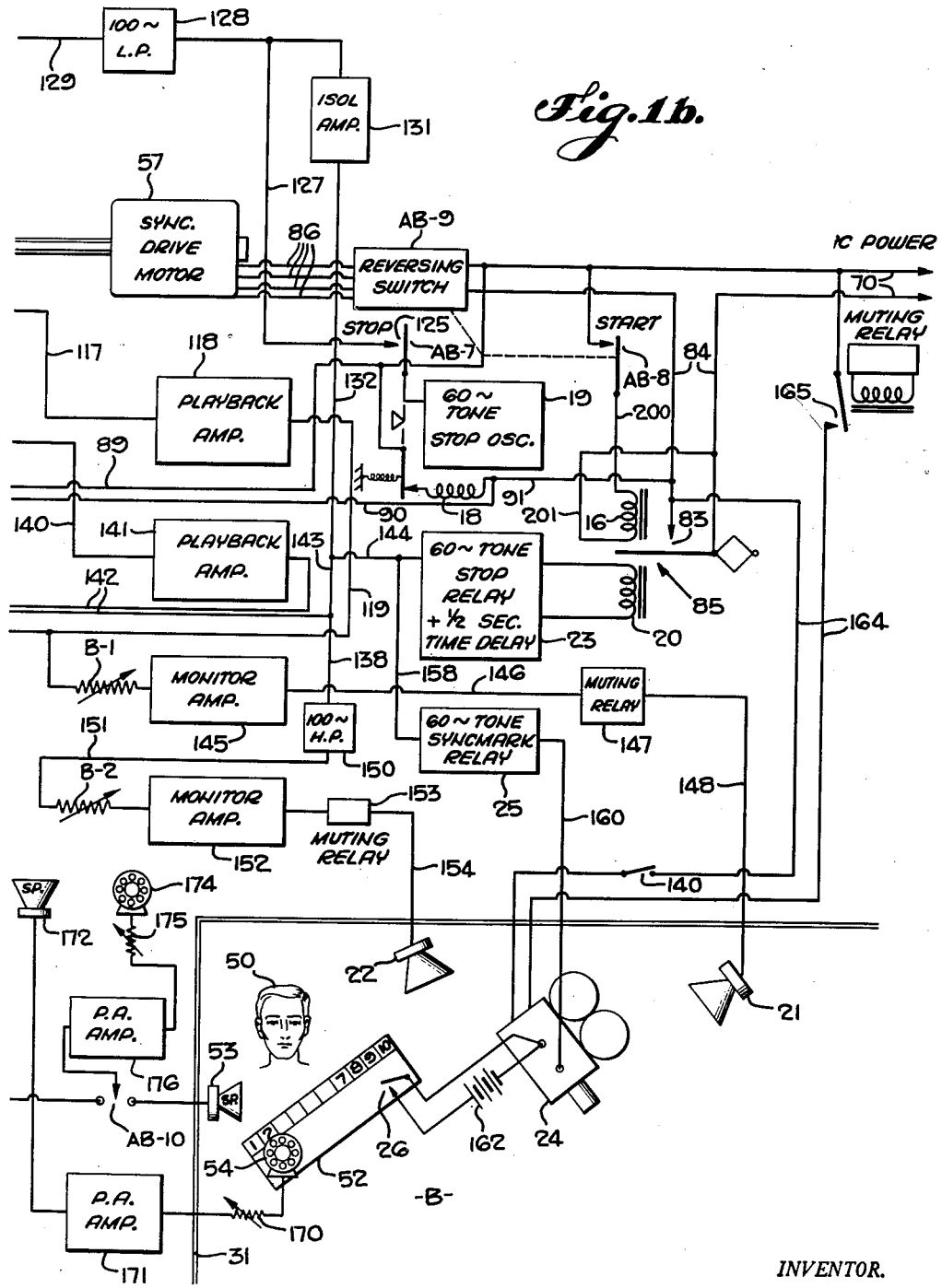

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figs. 1a and 1b show, as a single line drawing, the system embodying the invention.

Referring now to the drawing, it will be noted that the section included within the double lines 30 in Fig. 1a is the recording or "A" section of the recording system, while the section within the double lines 31 is the reproducing or "B" section of the sound system, the latter section also being referred to as the photographing or set section. There is provided, in section 30, a director's position 34, which includes a director's microphone 35 and a group of switch control buttons 1 to 11, inclusive, on a panel or control desk 37. Also positioned adjacent the director's position, are loudspeakers 39 and 44, the functions of which will be explained hereinafter. Separated from the director by a glass partition 38, is a space 40, in which the actors may be grouped around a table with their scripts, and which contains a group of headphones 41, connected in multiple through individual volume controls 42, and the actors' recording microphone 17.

On the stage or the sound reproducing section 31 or "B" section, is a director's position 50, a control panel or desk 52, with certain control buttons, as indicated, a speaker 21, a speaker 22, a speaker 53, a microphone 54, a camera 24, and a control switch 26.

Positioned at a distance from the two sections 30 and 31, is any standard type of magnetic recorder, illustrated as having a drive motor 57 and a film 58. This recorder will have two sets of erase heads, such as shown at 60 and 61; two sets of recording heads, such as shown at 63 and 64; and two sets of reproducing heads, such as shown at 66 and 67. Heads 60, 63, and 66 are for track $x$, and heads 61, 64, and 67 are for track $y$. Power is supplied to the drive motor from any suitable power source, over conductors 70, through a reversing switch AB-9. The use of the prefix letters "A," "B," or "AB" indicates that the element may be operated from either section 30 or "A," or from section 31 or "B," through relays or the switches are actually positioned on the control desks. Thus, the reversing switch AB-9 is under control of buttons 9 in either sections "A" or "B."

During a rehearsal, or before a sound take, the director may give instructions to the actors over a circuit including his microphone 35, conductor 73, limiter and preamplifier 72, monitor amplifier 74, conductor 77, and headphones 41. This circuit is permanently connected at all times, so that either between takes or during takes, the director may advise or instruct the actors.

To condition the equipment for recording, the director first closes switch A-11 by closing its left-hand contact, which also moves the swinger of switch 12 to the left to close its left-hand contact. The next switch operated by the director is AB-8, which connects the power source to the winding 16 of a toggle relay 85 over conductors 200, 201, and 84, the energization of which closes contact 83 of the toggle relay 85 and applies power over conductors 84, through reversing switch AB-9, and over the proper conductors 86 between the reversing switch and the drive motor 57 to drive the recorder in a forward direction. The closing of contact 83 also energizes winding 14 of switch A-11 over conductor 89, switch A-11, conductors 90 and 91, switch contact 83, and conductor 84. Energization of relay winding 14 moves the swingers of switches 13 and 15 to the right. This action connects the director's microphone 35 through preamplifier 72, over conductor 76, through one hundred cycle high-pass filter 75, conductor 79, volume control 80, recording and erase amplifier 78, conductor 92, closed switch contact 93, and conductor 94, to record head 64. Over conductor 204, closed contact 205, and conductor 206, the amplifier 78 is connected to erase head 61. Thus, as the film 58 travels from left to right, the oscillator in unit 78 erases any prerecorded or unwanted magnetism on the film, and the combination signal and bias oscillator current is impressed on record head 64. Simultaneously, the actors' microphone 17 is connected over conductor 97, through preamplifier 98, volume control A-4, equalizer and echo room 100 having controls A-1, A-2, and A-3, limiter and booster amplifier 102, conductor 103, conductor 106, volume control 107, record and erase amplifier 108, conductor 109, switch contact 111, and conductor 112 to record head 63. Over conductor 210, closed contact 211, and conductor 212, the bias oscillator is connected directly to erase head 60, which cleans up the record medium for the recording by head 63.

Since the swinger of switch 12 is operated simultaneously with the swinger of switch A-11, the left-hand contact of switch 12 is closed, and the right-hand contact of switch 13 is also closed by the energization of winding 14. The closure of these contacts connects the reproduce head 66 of track $x$ or the actors' dialogue track over conductor 117, playback amplifier 118, conductor 119, volume control A-6, closed contact of switch 13, conductor 115, closed contact of switch 12, conductor 121, and monitor amplifier 122, to the director's speaker 39. Thus, as the dialogue sound is recorded by record head 63, it is substantially immediately reproduced by reproducing head 66 for the benefit of the director, so that he may determine the actual quality of the dialogue being recorded on track $x$. During the recording of the actors' dialogue over the circuit traced above, the director's instructions are being recorded by record head 64 over the circuit traced above, so that there are two tracks being simultaneously recorded, one of the dialogue on track $x$, and the other of the director's instructions on track $y$.

Now, at the end of a take, the stop switch AB-7 is manually actuated, which closes contact 125, energizing a relay winding 18, to connect a sixty-cycle tone oscillator 19 over conductor 127 through a one hundred cycle low-pass filter 128, over conductor 129, to record amplifier 78, which transmits the tone to record head 64. Simultaneously, the sixty-cycle tone is impressed on an isolation amplifier 131, and over conductors 132 and 144 to a sixty-cycle tone relay having a one-half second time delay before it energizes the winding 20 of the toggle relay 85. When winding 20 is energized, contact 83 is broken, and the driving motor 57 is deenergized and the recorder is stopped. At the same time, the relay winding 14 is de-energized, since it receives its energy over contact 83, and the swingers of switches 15 and 13 return to their left-hand contacts under the tension of spring 215.

As so far described, therefore, the system permits the director to advise or instruct the actors with respect to their script during the recording thereof. During rehearsal, it also is possible for the actors to converse with the director over his speaker 39 through a circuit from microphone 17, conductor 97, preamplifier 98, equalizer 100, amplifier 102, conductor 103, conductor 135, volume control A-5, closed left-hand contact of switch 13, closed left-hand contact of switch 12, conductor 121, and monitor amplifier 122. Thus, the director and actors may consult one another; but, after the recorder is started by the closing of switch AB-8 by the director, the actors' dialogue is recorded on track $x$, and the director's instructions are recorded on track $y$. During these recordings, the dialogue track is reproduced by head 66, and the director hears the actors' dialogue as just recorded from his speaker 39. At the end of the sequence, the director actuates stop switch AB-7, which automatically applies a sixty-cycle tone to track $y$, to provide a synchronizing mark thereon, before the time delay relay de-energizes the driving motor.

Should any sequence be considered unsatisfactory by the director, he may actuate his reversing switch AB-9, and then start switch AB-8. During the reverse running of the recorder, it is unnecessary for the director to stop the recorder at the beginning of the take. The stopping is accomplished automatically, since, as the recorded tone at the end of the previous take reaches the reproduce head 67, it is impressed over conductor 140, playback amplifier 141, conductors 142, 143, and 144 on the time delay relay 23. The winding 20 is thus energized, and the contact 83 is broken, which will stop the recorder as described above. During the reverse running of the recorder-reproducer, the switch A-11 is open and the erase heads 60 and 61 are not energized, so that the record medium is ready for the new sequence, which may be recorded in the same manner as described above, the erase heads erasing the old sequence as the recording is made.

For using the recorded sequence during the photographing of a scene, which it is to accompany, the director, at a position such as 50 in section 31 or "B," again controls the recorder and reproducer by the buttons on his control desk 52, which control the start, stop, and reversing switches, as well as volume controls B-1 and B-2. Now, to describe the operation during the photographing of a picture sequence, which is to correspond to the previously recorded dialogue sequence, the recorder is started and the dialogue is reproduced at dialogue speaker 21 from reproduce head 66, over conductor 117, playback amplifier 118, conductor 119, volume control B-1, monitor amplifier 145, conductor 146, a muting relay 147, and conductor 148. Simultaneously, the director's instructions are reproduced at speaker 22 from reproduce head 67 and over conductor 140, playback amplifier 141, conductors 142, and closed contact 137, conductor 138, through a one hundred cycle high-pass filter 150, conductor 151, volume control B-2, monitor amplifier 152, muting relay 153, and conductor 154, to speaker 22. Thus, in addition to the actors' being given their actual script from speaker 21, they are also given the cues and the director's instructions over speaker 22. The director, however, being on the set at the time of the take, may also interpolate other instructions.

To synchronize the sound record with the picture film, the reproduce head 67 reproduces the sixty-cycle tone recorded thereon from the oscillator 19, this tone being transmitted over conductor 140, playback amplifier 141, conductors 142, 143, 144, and 158 to a sixty-cycle synchronizing mark relay 25, which is connected over conductor 169 to a solenoid punch (not shown) in the camera. The sixty-cycle tone controls the actuation of the film punch, which will notch the picture film on one side at the instant the tone is reproduced. There is thus provided a mark on the picture film simultaneously with the mark on the sound record. These marks are used in editing, as disclosed and claimed in my co-pending U. S. application, Ser. No. 110,292, filed August 15, 1949.

In the event that the picture sequence just photographed is considered unsatisfactory by the director, he may close switch 26 at his desk, which, over a power source 162, energizes a second solenoid punch (not shown) in the camera, which will notch the film on the opposite side and a little behind the punch mark made by the sound track synchronizing tone. After the second mark has been made, the recorder is reversed to return the sound film to the beginning of that particular take, in the same manner as during the reverse operation required to make a new sound sequence. That is, the reverse switch AB-9 is manually operated to reverse the sound film 58, and, when the next sixty-cycle tone synchronizing mark reaches the reproduce head 67, the recorder will be automatically stopped by relay 23, as described above. The camera and recorder are then again started simultaneously, the camera being energized over conductors 164, camera switch 140, toggle switch contact 83, and muting relay contact 165.

By the provision of the second punch mark to indicate a bad sequence, this take may be eliminated in the darkroom when the film is unreeled, since the unreeling occurs in the reverse order to the photographing, and the double marks of any sequence will arrive first. The film may be cut at this point and then the film unwound to the beginning of the take indicated by a single punch mark. At that point, the film may be cut and the bad take removed, and the two film ends spliced together.

There is thus provided an automatic system which will permit the pre-scoring of the dialogue for the picture sequences, thus eliminating the necessity for the actors to fully memorize their lines. Since the recording is done under the most favorable acoustical conditions, the sound track to accompany the picture will be of a higher quality than otherwise. Furthermore, it permits the photographing of many more sequences in a given time period, since the actors do not have to memorize their lines completely, they are perfectly cued during the acting of the sequence, and the original sound recording will be synchronized with the picture sequences after the unsatisfactory picture takes are removed.

To permit intercommunication between different sections, a public address system may be provided, in which the microphone 54 in section 31 is connected over volume control 170 and amplifier 171, to a speaker 172, while a microphone 174 is connected over volume control 175 and amplifier 176 to either speaker 53 in section 31 or speaker 44 in section 30, depending upon the actuation of switch AB-10, which is controlled from both sections 30 and 31. A monitor amplifier 217 with its speaker 218 and volume control 219 will indicate the impression of the synchronizing mark tone on track y, and will monitor the director's microphone 35 whether or not the recorder is running, and will also permit communication with the recorder operator. The muting relays may be actuated by the reverse switch AB-9, either electrically or mechanically to eliminate the starting noises of the recorder and camera and to prevent reproduction of the sound records while the film is reversing. Muting relays 147 and 153 simply short the line while relay 165 opens the camera power supply.

The above described system provides, therefore, a pair of sound records in synchronism, which result in the actual final sound record for picture sequences, cues, and director's instructions. This permits the rapid production of the sound record and the picture sequences, since the minimum in man power is required, and the larger number of sequences obtainable reduces the former large cost per sequence.

It is realized that other circuits may be used for interconnecting the controlling elements to provide the automatic marking of the film and stopping of the recorder during both recording and reproduction, but the scope of the invention is determined by the appended claims. The control circuit described above may also be used to control other units. Furthermore, for large sets, a large loop around the set carrying currents modulated by the director's instructions and/or the dialogue track, may be detected by concealed earphones worn by the actors as is well-known in the art. The system also eliminates the use of microphone booms requiring several operators, and, therefore, makes the lighting of sets simpler, since microphone shadow is not a problem. As the sound produced on the set is not detected, there is no need for the usual complete silence during photographing, and other sets may be dressed during this time, while instructions may be given during the takes. All these features result in less unsatisfactory takes and more good takes within a given length of time.

I claim:

1. A sound system, comprising an energy source, a sound recorder, a sound recording channel, a sound reproducing channel, and a control mechanism for connecting said energy source to said recorder and connecting and disconnecting said recording and reproducing channels to and from said recorder, said control mechanism including start and stop switch mechanisms between said energy source and recorder, said start switch mechanism energizing said recorder when actuated in one direction, and said system includes an oscillator, a time delay relay, and a circuit interconnecting said recorder and oscillator, said stop switch mechanism connecting said oscillator to said recorder and connecting said oscillator to said time delay relay, said time delay relay being connected to said start switch mechanism to disconnect said energy source from said recorder.

2. A sound recording and reproducing system, comprising a recording control panel, a reproducing control panel, a combination sound recorder and reproducer, a plurality of sound recording channels connectable to said recorder-reproducer, a plurality of sound reproducing channels connectable to said recorder-reproducer, control circuits from said recording control panel to said recorder-reproducer for starting said recorder-reproducer, duplicate control circuits from said reproducing control panel to said recorder-reproducer for starting said recorder-reproducer, stopping means for said recorder-reproducer, means for generating synchronization signals, means for impressing said signals on said recorder-reproducer and on said stopping means, said stopping means including a tone generator connectable to one of said recording channels and a time delay relay, said tone generator when connected to one of said recording channels impressing on said recording channel the tone generated thereby, and means for impressing said tone on said time delay relay, said time delay relay being connected to said stopping means for stopping said recorder-reproducer.

3. A sound recording and reproducing system, comprising a recording control panel, a reproducing control panel, a combination sound recorder and reproducer, a plurality of sound recording channels connectable to said recorder-reproducer, a plurality of sound reproducing channels connectable to said recorder-reproducer, control circuits from said recording control panel to said recorder-reproducer for starting said recorder-reproducer, duplicate control circuits from said reproducing control panel to said recorder-reproducer for starting said recorder-reproducer, stopping means for said recorder-reproducer, means for generating synchronization signals, means for impressing said signals on said recorder-reproducer and on said stopping means, a camera for photographing pictures concomitant with the sound in one of said channels, synchronization marking means in said camera, and means for utilizing said generated synchronization marks for simultaneously stopping said camera and said recorder-reproducer and for actuating said synchronization marking means in said camera.

4. A sound system for synchronously recording a concomitant signal for a picture and an instruction signal for said concomitant signal, comprising an energy source, a sound recorder, drive means for said recorder and adapted to be energized from said energy source, a recording channel including means for recording said concomitant signal, a second recording channel including means for recording said instruction signal, a sound reproducing channel including means for reproducing said concomitant signal, a second sound reproducing channel including means for reproducing said instruction signal, a start switch connected between said energy source and said driving means for said recorder, means for generating a control signal, a stop switch adapted when actuated to connect said last mentioned means to one of said recording channels, and means for connecting said last mentioned means to said start switch for disconnecting said energy source from said driving means.

5. A sound system in accordance with claim 4, in which said start switch mechanism includes a relay having a contact for connecting said energy source and said driving means, the closing of said contact starting said recorder, and said means for generating said tone is a tone generator, a switch being provided to connect said generator to one of said recorder channels, and a time delay relay being provided to connect said tone generator to said start switch.

6. A sound system in accordance with claim 4, in which a third sound recording channel is provided, together with means for generating a third signal to be recorded and reproduced, one of said reproducing channels reproducing the concomitant signal during the recording thereof and during the recording of said instruction signal, and means connectable to said reproducing channel for stopping said recorder when said third signal is reproduced.

7. A system for controlling the simultaneous recording of a pair of separate parallel sound tracks on a film, comprising means for generating a signal sequence corresponding to the dialogue of a picture story, means for generating a sequence corresponding to instructions for presenting said dialogue sequence and the picture action corresponding thereto, means for simultaneously and independently recording both of said signals on said film, means for generating a control signal, means for recording said control signal on said film at the end of one of said sequences after said sequences have been recorded, means for simultaneously reproducing said dialogue signal sequence with the instruction signal sequence from the records thereof, and means for reproducing said control signal to stop said reproduction.

8. A system in accordance with claim 7, in which means are provided for recording said control signal at the end of said instruction signal, together with means for impressing said control signal as a synchronization mark on another film.

9. A system for controlling the stopping of a sound recorder, comprising means for generating a tone, means for impressing said tone on said recorder at the end of a recorded sequence, a recorder stopping circuit, means for simultaneously impressing said tone on said recorder stopping circuit, and means for delaying the transmission of said tone to said stopping circuit to permit the recording of said tone.

10. A system for controlling the stopping of a sound recorder, comprising means for generating a tone, means for impressing said tone on said recorder at the end of a recorded sequence, a recorder stopping circuit, means for simultaneously impressing said tone on said recorder stopping circuit, means for delaying the transmission of said tone to said stopping circuit to permit the recording of said tone, means for subsequently reproducing said recorded tone, and means for impressing said tone on said recorder stopping circuit.

11. A sound recording and reproducing system, comprising a sound recorder adapted to simultaneously record a plurality of independent parallel tracks of different signals; means for driving said recorder; a sound pick-up element, an amplifier, and a recording head for recording each of said tracks; a switch for energizing and deenergizing said driving means; and a track detecting element, an amplifier, and a loudspeaker for simultaneously reproducing each of said tracks; one of said recorder tracks being reproduced by a respective track detecting element, an amplifier, and a loudspeaker during the recording of one of said plurality of tracks.

12. A sound recording and reproducing system in accordance with claim 11, in which a tone generator is provided, together with a switch for connecting said generator to one of said recording heads for recording a tone on one of said plurality of tracks and for actuating said first mentioned switch for deenergizing said driving means to stop said recorder.

13. A sound recording and reproducing system in accordance with claim 11, in which a tone generator is provided, together with a switch for connecting said generator to one of said heads for recording a tone in one of said tracks, said tone being detected by one of said track detecting elements, and means connecting said detecting element to said first mentioned switch for deenergizing said driving means to stop said recorder.

14. A sound recording and reproducing system in accordance with claim 11, in which a picture camera is provided, together with means for generating a tone signal, a switch for connecting said generating means to one of said recording heads, means for connecting the detecting element detecting said recording tone to said camera, and means for impressing said tone on said first mentioned switch for de-energizing said driving means and on said camera for producing a synchronization mark on the film in said camera.

15. A sound recording and reproducing system comprising a sound record medium, a recording control panel, a reproducing control panel, a combination sound recorder-reproducer connected to both of said panels, a plurality of sound recording channels for simultaneously recording a pair of sound tracks on said medium, a plurality of sound reproducing channels for simultaneously reproducing said sound tracks on said medium, interconnecting circuits between said recording control panel and said recorder-reproducer for starting and stopping said combination recorder-reproducer, duplicate interconnecting circuits between said reproducing control panel and said recorder-reproducer to start and stop said recorder-reproducer, means for generating a tone, means for connecting said tone generating means to one of said sound recording channels for recording said tone on one of said tracks when said control panel is actuated to stop said recorder-reproducer, said tone providing synchronization marks on said sound record medium, means for utilizing said tone to stop said recorder-reproducer, and means for utilizing said recorded tone for stopping said combination recorder-reproducer upon the reproduction of said tone and to produce synchronization marks on a second film medium.

16. A sound recording system comprising a sound recorder, a sound recording channel connected to said recorder for recording a signal track, said channel including a plurality of microphones connected in parallel thereto to record dialogue signals from a plurality of persons, a second recording channel connected to said recorder for simultaneously recording a second signal track independent of said first mentioned signal track and parallel with said first signal track, said second channel including a microphone acoustically isolated from said plurality of microphones, and a reproducing channel connected to said recorder for reproducing said dialogue signals during the recording thereof, said reproducing channel including a loudspeaker adjacent said microphone of said second recording channel.

17. A sound recording system in accordance with claim 16, in which starting and stopping controls are provided for said recorder and are positioned adjacent said loudspeaker and said one microphone.

ALEXIS BADMAIEFF.

REFERENCES CITED

The following references are of record in the file of this patent:

UNITED STATES PATENTS

| Number | Name | Date |
|---|---|---|
| 1,528,424 | Holland | Mar. 3, 1925 |
| 1,802,595 | De Forest | Apr. 28, 1931 |
| 1,855,981 | Mittell | Apr. 26, 1932 |
| 1,909,765 | Jenkins et al. | May 16, 1933 |
| 1,929,519 | Ross | Oct. 10, 1933 |
| 2,022,665 | Halstead | Dec. 3, 1935 |
| 2,075,861 | Mueller | Apr. 6, 1937 |
| 2,116,314 | Jenkins et al. | May 3, 1938 |
| 2,221,312 | Jenkins et al. | Nov. 12, 1940 |
| 2,310,340 | Arndt | Feb. 9, 1943 |
| 2,320,434 | Holcomb | June 1, 1943 |
| 2,350,727 | Collins | June 6, 1944 |
| 2,378,611 | Westerkamp | June 19, 1945 |
| 2,475,439 | Waller | July 5, 1949 |
| 2,475,641 | Rosenberg | July 12, 1949 |
| 2,514,578 | Heller | July 11, 1950 |

FOREIGN PATENTS

| Number | Country | Date |
|---|---|---|
| 417,611 | Great Britain | Oct. 9, 1934 |